US010722850B2

(12) United States Patent
Ong et al.

(10) Patent No.: US 10,722,850 B2
(45) Date of Patent: Jul. 28, 2020

(54) HOLLOW FIBER MEMBRANE FOR DEHYDRATION OF ORGANIC SOLVENTS VIA PERVAPORATION PROCESS AND A METHOD OF FABRICATING THE SAME

(71) Applicant: National University of Singapore, Singapore (SG)

(72) Inventors: Yee Kang Ong, Singapore (SG); Tai-Shung Chung, Singapore (SG)

(73) Assignee: National University of Singapore, Singapore (SG)

( * ) Notice: Subject to any disclaimer, the term of this patent is extended or adjusted under 35 U.S.C. 154(b) by 1099 days.

(21) Appl. No.: 14/203,185

(22) Filed: Mar. 10, 2014

(65) Prior Publication Data

US 2015/0251140 A1   Sep. 10, 2015

Related U.S. Application Data

(60) Provisional application No. 61/776,919, filed on Mar. 12, 2013.

(51) Int. Cl.
| | | |
|---|---|---|
| *B01D 71/68* | (2006.01) | |
| *B01D 69/08* | (2006.01) | |
| *B01D 71/34* | (2006.01) | |
| *B01D 71/64* | (2006.01) | |
| *B01D 71/16* | (2006.01) | |
| *B01D 71/50* | (2006.01) | |
| *D01D 5/24* | (2006.01) | |
| *B01D 61/36* | (2006.01) | |
| *B01D 71/58* | (2006.01) | |
| *B01D 71/52* | (2006.01) | |

(52) U.S. Cl.
CPC .......... *B01D 71/68* (2013.01); *B01D 69/088* (2013.01); *B01D 71/16* (2013.01); *B01D 71/34* (2013.01); *B01D 71/50* (2013.01); *B01D 71/52* (2013.01); *B01D 71/58* (2013.01); *B01D 71/64* (2013.01); *D01D 5/24* (2013.01); *B01D 61/362* (2013.01)

(58) Field of Classification Search
None
See application file for complete search history.

(56) References Cited

U.S. PATENT DOCUMENTS

| | | | | |
|---|---|---|---|---|
| 4,371,487 A | * | 2/1983 | Hamada | ................. B01D 69/08 |
| | | | | 210/500.32 |
| 2011/0114559 A1 | * | 5/2011 | Fislage | ................. B01D 53/22 |
| | | | | 210/648 |

OTHER PUBLICATIONS

Pereira et al., Hollow fiber membranes obtained by simultaneous spinning of two polymer solutions: a morphological study, 226 J. Membrane Sci. 35, 35-50 (2003).*
Yee Kang Ong & Tai-Shung Chung, High performance dual-layer hollow fiber fabricated via novel immiscibility induce phase separation (I2PS) process for dehydration of ethanol, 421-422 J. Membrane Sci. 271, 271-282 (2012).*
Li et al., Fabrication of fluoropolyimide/polyethersulfone (PES) dual-layer asymmetric hollow fiber membranes for gas separation, 198 J. Membrane Sci. 211, 211-223 (2002).*
Li et al., Fabrication of fluoropolyimide/polyethersulfone (PES) dual-layer asymmetric hollow fiber membranes for gas separation, 198 J. Membrane Sci. 211, 211-223 (2002). (Year: 2002).*
Pereira et al., Hollow fiber membranes obtained by simultaneous spinning of two polymer solutions: a morphological study, 226 J. Membrane Sci. 35, 35-50 (2003). (Year: 2003).*
Jiang, et al., "Interfacial resistance of dual-layer asymmetric hollow fiber pervaporation membranes formed by co-extrusion", J. Polym Res. (2011) 18:2505-2514.
Ong, et al., "Pushing the Limits of High Performance Dual-Layer Hollow Fiber Fabricated via I²PS Process in Dehydration of Ethanol", AIChE Journal, vol. 59, No. 8, 2013.
Ong, et al., "Highperformance dual-layer hollow fiber fabricated via novel immiscibility induced phase separation (I²PS) process for dehydration of ethanol", Journal of Membrane Science, 421-422 (2012).

* cited by examiner

*Primary Examiner* — Krishnan S Menon
*Assistant Examiner* — Brad Gordon
(74) *Attorney, Agent, or Firm* — Cesari and McKenna, LLP

(57) ABSTRACT

Disclosed is a hollow fiber that contains an outer layer made of a first polymer and an inner layer made of a second polymer, the inner layer including at its outer surface a macrovoid-free thin interface sublayer in contact with the inner surface of the outer layer. The first polymer is immiscible with the second polymer. Also disclosed is a process of preparing the above-described hollow fiber.

20 Claims, No Drawings

HOLLOW FIBER MEMBRANE FOR DEHYDRATION OF ORGANIC SOLVENTS VIA PERVAPORATION PROCESS AND A METHOD OF FABRICATING THE SAME

CROSS-REFERENCE TO RELATED APPLICATIONS

This application claims the benefit of U.S. Provisional Application No. 61/776,919 filed on Mar. 12, 2013. The contents of both applications are hereby incorporated by reference in their entirety.

BACKGROUND

Biofuels such as bioethanol have been widely used to substitute fossil fuels in the transportation (e.g., gasoline blended with bioethanol) and agricultural sectors. Yet, preparation of fuel-grade ethanol, i.e., anhydrous ethanol, by traditional distillation is an energy intensive process. As a result, significant efforts have been made to explore alternative dehydration techniques that consume less energy.

Pervaporation is known to be energy efficient and to outperform conventional distillation in dehydration of ethanol. The efficiency of membrane-based pervaporation is influenced by membrane materials and the membrane design. In this regard, a hollow fiber is superior to a flat membrane. Recently, the use of a dual-layer hollow fiber for performing pervaporation has gained wide acceptance. Typically, a dual-layer hollow fiber is prepared by a spinning technology that requires different polymer materials for the two layers. To reduce cost, the outer layer, serving as a selective layer, is made of a high performance material, whereas the inner layer, serving as a support layer, is fabricated from an inexpensive material. As the outer layer is unshielded, its swelling reduces pervaporation efficiency.

The need exists to obtain high-performance hollow fibers for use in dehydration of ethanol and other organic solvents via a pervaporation process.

SUMMARY

This invention relates to a dual-layer hollow fiber that features a selective layer that swells minimally and has both an unexpectedly high water flux rate and an unexpectedly high separation efficiency. As such, it is suitable for use in a pervaporation process.

Within this invention is a hollow fiber that contains an outer layer formed of a first polymer and an inner layer formed of a second polymer. The outer surface of the inner layer is in contact with the inner surface of the outer layer. The inner layer includes at its outer surface a thin interface sublayer that is in contact with the inner surface of the outer layer and free of macrovoids.

Examples of the first and second polymers include polyimide, co-polyimide, polyamide-imide, polyether-imide, cellulose acetate, cellulose diacetate, cellulose triactate, polyamides, polysulfone, polyethersulfone, polyphenylsulfone, polyacrylonitrile, polyvinylidene fluoride, polycarbonate, polybenzimidazole, polyvinyl alcohol, alginates, chitosan, and polyvinylpyridine.

Preferably, the first polymer is polyvinylidene fluoride, polyimide, or cellulose triacetate and the second polymer is polyether-imide, polysulfone, or co-polyimide.

In one embodiment, the first polymer is cellulose triacetate and the second polymer is polyether-imide.

Also within this invention is a process for preparing a hollow fiber. The process includes: (i) dissolving a first polymer in a first solvent to prepare a first spinning dope; (ii) dissolving a second polymer in a second solvent to prepare a second spinning dope, the first polymer being immiscible with the second polymer; (iii) mixing 10-99 wt % N-methyl-2-pyrrolidone (NMP) in a third solvent to prepare a bore fluid; (iv) providing a triple orifice spinneret that has an external orifice, a middle orifice, and an internal orifice; and (v) co-extruding the first spinning dope and the second spinning dope respectively through the external orifice and the middle orifice via a dry-jet wet-spinning process into a coagulation bath and at the same time passing the bore fluid through the internal orifice, to form a hollow fiber having an inner layer and an outer layer. The inner layer includes at its outer surface a macrovoid-free thin interface layer in contact with the inner surface of the outer layer.

Examples of the first polymer and the second polymers are enumerated above. Each of first and second solvents can be, independently, NMP, tetrahydrofuran, methanol, dimethylacetamide, dioxane, dichloromethane, dimethylformamide, dimethyl sulfoxide, acetone, ethanol, propanol, butanol, glycol, or water. The third solvent can be water, n-hexane, kerosene, dimethylacetamide, dioxane, dichloromethane, dimethylformamide, dimethyl sulfoxide, acetone, ethanol, propanol, butanol, or glycol.

The flow rates of the first spinning dope, the second spinning dope, and the bore fluid can be 0.01 to 10 ml/min, 0.01 to 20 ml/min, and 0.01 to 20 ml/min, respectively. The co-extruding step can be performed at 10° C. to 70° C. and the coagulation bath can be kept at 5° C. to 70° C. Additionally, there can be an air gap of up to 100 cm between the coagulation bath and the spinneret during the co-extruding step.

In one embodiment, the first solvent is NMP, the second solvent is NMP, the third solvent is water, the flow rates of the first spinning dope, the first spinning dope, and the bore fluid are 0.2 ml/min, 1.5 ml/min, and 1 ml/min, respectively, the co-extruding step is performed at 25° C., the coagulation bath is kept at 25° C., and there is an air gap of 1.5 cm between the coagulation bath and the spinneret during the co-extruding step.

Also within the scope of this invention is a hollow fiber prepared by the above-described process.

The details of the invention are set forth in the description below. Other features, objects, and advantages of the invention will be apparent from the description and from the claims.

DETAILED DESCRIPTION

The hollow fiber of this invention contains both an inner layer that includes a thin interface sublayer and an outer layer. The thin interface sublayer serves as a selective layer and the outer layer serves as a protective layer for the interface sublayer. Further, the thin interface sublayer is free of macrovoids; namely, it contains no more than 2 macrovoids per $\mu m^3$. A macrovoid is an undesirable open space in the sublayer that has a volume of at least $10^5$ $nm^3$.

A first polymer and a second polymer are used respectively to prepare the outer layer and the inner layer. The first polymer is immiscible with the second polymer. Miscibility of the first polymer and the second polymer is determined by an assay described in Ong et al. Journal of Membrane Science 421-422, (2012) 271-282. To prepare the hollow fiber, solutions of the first and second polymers are made separately. When the first and second polymer solutions are simultaneously extruded through a spinneret to form the hollow fiber, a thin interface sublayer is formed at the outer surface of the inner layer as a result of the immiscibility between these two polymers, a so-called "immiscibility induced phase separation ($I^2PS$) process." It takes advantage of the phase separation phenomenon that results from immiscibility of the first and second polymers. In the hollow fiber thus prepared, the outer layer functions as a shielding layer to protect the thin interface sublayer beneath and minimize its swelling.

Preferably, the critical concentration of the first polymer is lower than that of the second polymer. The critical concentration of a polymer in a solvent system can be obtained through an exponentially correlated relationship, i.e., an exponential curve, between the viscosity of the polymer solution at a specific shear rate and the concentration of the polymer. The critical concentration is defined as the concentration of the polymer corresponds to the intersecting point of the two tangent lines respectively from the low and high viscosity regions of the exponential curve.

The critical concentrations, in NMP at a shear rate of 10 $s^{-1}$, of three exemplary first polymers are 16 wt % for polyimide, 13 wt % for polyvinylidene fluoride, and 12 wt % for cellulose triacetate; and those for three exemplary second polymers are 30 wt % for polyether-imide, 29 wt % for polysulfone, and 28 wt % for co-polyimide (P84 from HP Polymer GmbH).

Described below is a procedure that can be followed to prepare a hollow fiber of this invention.

First and second spinning dopes are prepared respectively by dissolving a first polymer (e.g., cellulose triacetate) in a first solvent (e.g., NMP) and by dissolving a second polymer (e.g., polyether-imide) in a second solvent (e.g., NMP). A bore fluid is also prepared by mixing 10-99 wt % NMP in a third solvent (e.g., water). A hollow fiber is fabricated by co-extrusion of the first spinning dope, the second spinning dope, and the bore fluid respectively through the external, the middle, and the internal orifices of a triple-orifice spinneret via a dry-jet wet-spinning process. The polymer solutions and the bore fluid are extruded through an air gap at a free-fall speed by the gravitational force before entering a coagulation bath. The hollow fiber thus prepared is immersed in water for two days to ensure complete removal of any residual solvent. It is then solvent-exchanged through three consecutive immersions in methanol for 30 minutes and then in n-hexane following the same protocol. Finally, the fiber is air-dried and stored at room temperature.

The hollow fiber thus prepared is evaluated for performance in a pervaporation process. A feed solvent mixture, or, in short, a feed, is circulated in the shell side of the fiber at a flow rate of 0.5 L/min and the feed temperature is maintained at 50° C. The downstream pressure is maintained less than 1 mbar throughout the process and a steady state condition is maintained for 2 hours before the permeate sample collection is started. Permeate samples are then collected by a cold trap immersed in the liquid nitrogen at different time points and weighed by a digital balance to determine their fluxes. The composition of each sample is further analyzed by an Agilent Technologies GC system 7890A gas chromatography equipped with a HP-INNO-WAX column (packed with cross-linked polyethylene glycol) and a thermal conductivity detector. The feed concentration varies less than 1 wt % throughout the process. It can be considered as a constant in view of the large volume of the feed, as compared to that of the permeate sample.

The flux (J) is defined as follows:

$$J = \frac{Q}{A \times t}$$

In the above equation, J is the flux, Q is the total weight of permeate collected after a specific period (t), and A is the effective surface area of the fiber tested.

The performance of a hollow fiber in a pervaporation process can be converted into permeance and selectivity so as to provide reliable and realistic benchmarking values. The permeance of a particular component (e.g., water) is defined as:

$$\frac{P_i}{l} = \frac{J_i}{(f_{i,f} - f_{i,p})}$$

$P_i/l$ is the permeance of component i across the hollow fiber membrane, l is the thickness of the selective layer, and $f_{i,f}$ and $f_{i,p}$ are fugacities or partial vapor pressures of component i on the feed side and the permeate side of the membrane, respectively.

The fugacity of component i on the feed side based on its liquid concentration can be determined by:

$$f_{i,f} = x_i y_i P_i^{sat}$$

In the above equation, $x_i$, $y_i$, and $P_i^{sat}$ are respectively the mass fraction, the activity coefficient and the saturated vapor pressure of component i in the feed.

The selectivity (α) of the membrane is defined as the permeance ratio of components i and j (e.g., water and ethonal):

$$\alpha_{ij} = \frac{P_i/l}{P_j/l}$$

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Example 1 Characterization of Hollow Fibers Prepared from Different Outer-Layer Materials A study was conducted to assess the effects of different outer-layer materials on performance of hollow fibers in dehydrating ethanol. A wide array of the polymer materials, i.e., polyimide (PI, synthesized via chemical imidization route), cellulose triacetate (CTA, CA-436-80S, provided by Eastman Chemical Company), and polyvinylidene fluoride polymer (PVDF, Kynar HSV 900, obtained from Arkema Inc.), were selected as the first polymer, i.e., the material for the outer layer. Polyetherimide (PEI, known as Ultem®) was used as the second polymer. NMP and tetrahydrofuran (THF, analytical grade) were selected as the first solvent. NMP and water were used respectively as the second solvent and the third solvent. The spinning conditions for preparing the hollow fibers are listed in Table 1 below. The Ultem® single-layer hollow fiber prepared by extruding only the inner-layer dope solution through the triple orifice spinneret served as the control throughout this study.

It was observed unexpectedly that a thin interface sublayer free of macrovoids was formed at the outer surface of the inner layer. The outer layer was closely attached to this thin interface sublayer without any delamination, serving as a protective layer for it.

All the hollow fibers thus prepared were evaluated for their capability to dehydrate ethanol at 50° C. using a feed mixture of an aqueous ethanol solution (ethanol/water: 85/15 wt %). The results are shown in Table 2 below. A single-layer (Ultem®) hollow fiber without an outer layer served as the control. The results show that when CTA, a hydrophilic material, was used as the first polymer, the hollow fiber thus prepared had an unexpectedly high permeate water concentration, i.e., 96 wt %, and an unexpectedly high mole-based water/ethanol selectivity, i.e., 824.

TABLE 1

Spinning conditions for hollow fibers prepared from different outer-layer materials

| Spinning Parameters | Conditions | | |
|---|---|---|---|
| Outer layer dope composition (wt %) | PI/NMP/THF (22/49/29) | PVDF/NMP (15/85) | CTA/NMP (13/87) |
| Inner layer dope composition (wt %) | Ultem ® 1010/NMP (25/75) | | |
| Bore fluid composition (wt %) | NMP/water (95/5) | | |
| Outer layer dope flow rate (ml/min) | 0.2 | | |
| Inner layer dope flow rate (ml/min) | 1.5 | | |
| Bore fluid flow rate (ml/min) | 1 | | |
| Air gap (cm) | 1.5 | | |
| Take up speed (m/min) | Free fall | | |
| Spinneret temperature (° C.) | 25 | | |
| External coagulant temperature (° C.) | 25 | | |
| External coagulant | Water | | |

TABLE 2

Performance of hollow fibers prepared from different outer-layer materials

| | Flux (kg/m$^2$h) | Permeate water concentration (wt %) | Water permeance (mole/m$^2$ h kPa) | Mole based selectivity (water/ethanol) |
|---|---|---|---|---|
| Ultem ® | 11.30 | 20.0 | 37.59 | 9 |
| PVDF-Ultem ® | 0.33 | 93.4 | 5.13 | 492 |
| PI-Ultem ® | 1.06 | 95.5 | 16.88 | 730 |
| CTA-Ultem ® | 1.84 | 96.0 | 29.33 | 824 |

Feed: Ethanol/water (85/15 wt %) at 50° C.

Example 2 Characterization of Hollow Fibers Prepared from Different Inner-Layer Materials To study the effects of inner-layer materials on the performance of hollow fibers in dehydrating ethanol, various hollow fibers were prepared using polyetherimide (Ultem®), polysulfone (PSf, known as Udel® from Solvay Advanced Polymers), and co-polyimide of 3,3'4,4'benzophenone tetracarboxylicdianhydride and 80% methylphenylenediamine plus 20% methylenediamine (P84® from HP Polymer GmbH) each as the second polymer, i.e., the material for the inner layer. The spinning conditions for preparing the hollow fibers are listed in Table 3 below. The single-layer hollow fiber prepared by extruding only the inner-layer dope solution through the triple orifice spinneret functioned as the control throughout this study. All the hollow fibers thus prepared were evaluated for their capability in dehydrating ethanol at 50° C. using a feed mixture of an aqueous ethanol solution (ethanol/water: 85/15 wt %). The results are listed in Table 4 below.

The data in Table 4 show that when polyetherimide (Ultem®) was used as the second polymer, the hollow fiber thus prepared had an unexpectedly high permeate water concentration, i.e., 85.2 wt %. In addition, it was observed that this hollow fiber had a highly porous structure at the inner surface of both the outer and inner layers.

TABLE 3

Spinning conditions for hollow fibers prepared from various inner-layer materials

| Spinning Parameters | Conditions |
|---|---|
| Outer-layer dope composition (wt %) | CTA/NMP (10/90) |
| Inner-layer dope composition (wt %) | Ultem ®/NMP (25/75); PSf/NMP (25/75); P84 ®/NMP (25/75) |
| Bore fluid composition (wt %) | NMP/water (95/5) |
| Outer layer dope flow rate (ml/min) | 0.2 |
| Inner layer dope flow rate (ml/min) | 1.5 |
| Bore fluid flow rate (ml/min) | 1 |
| Air gap (cm) | 1.5 |
| Take up speed (m/min) | Free fall |
| Spinneret temperature (° C.) | 25 |
| External coagulant temperature (° C.) | 25 |
| External coagulant | Water |

TABLE 4

Performance of hollow fibers prepared from different inner-layer materials

| Fiber ID | Flux (kg/m$^2$h) | Permeate water concentration (wt %) |
|---|---|---|
| CTA/PSf | 0.73 | 76.0 |
| CTA/Ultem ® | 2.81 | 85.2 |
| CTA/P84 ® | 12.70 | 24.6 |
| PSf | 8.71 | 14.8 |
| Ultem ® | 11.30 | 20.0 |
| P84 ® | 13.15 | 19.2 |

Feed: Ethanol/water (85/15 wt %) at 50° C.

Example 3 Characterization of Hollow Fibers Prepared with Different Bore Fluids and from Different Inner-Layer Polymer Solutions A study was conducted to assess the effects of different bore fluids and different inner-layer polymer solutions on the performance of hollow fibers in dehydrating ethanol. Listed in Table 5 below are compositions of different bore fluids and polymer solutions used.

All the hollow fibers thus prepared were evaluated for their capability in dehydrating ethanol at 50° C. using a feed mixture of an aqueous ethanol solution (ethanol/water: 85/15 wt %). The results are also shown in Table 5. The performance of hollow fibers in dehydrating ethanol varied depending upon the bore fluids and the inner-layer polymer solutions used in their preparation. The hollow fiber prepared with a 95% NMP (in water) bore fluid had an unexpectedly high permeate water concentration, i.e., 94.7 wt %. It also had a high water/ethanol separation factor, i.e., 96.

TABLE 5

Performance of hollow fibers prepared with different bore fluids and from different inner-layer solutions

| Membrane ID | Inner-layer dope composition (wt %) | Bore fluid composition (wt %) | Flux (kg/m$^2$h) | Water concentration in permeate (wt %) | Separation Factor (water/ethanol) |
|---|---|---|---|---|---|
| CTA/Ultem ® | Ultem ®/NMP (25/75) | NMP/water (95/5) | 2.47 | 94.7 | 96 |
| CTA/Ultem ®-K | Ultem ®/NMP (25/75) | NMP/kerosene (95/5) | 2.75 | 93.2 | 79 |
| CTA/Ultem ®-EK | Ultem ®/NMP/ethanol (25/65/10) | NMP/kerosene (95/5) | 3.04 | 91.8 | 62 |

CTA/Ultem ®: NMP/water (95/5 wt %) as bore fluid
CTA/Ultem ®-K : NMP/kerosene (95/5 wt %) as bore fluid
CTA/Ultem ®-EK: Ultem ®/NMP/ethanol (25/65/10 as inner-layer dope solution; NMP/kerosene (95/5 wt %) as bore fluid
Inner-layer dope flow rate: 1.5 ml/min; Outer-layer dope flow rate: 0.2 ml/min
Bore fluid flow rate 1.2 ml/min; air gap: 1.5 cm; take up speed: free fall
Feed: Ethanol/water (85/15 wt %) at 50° C.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A process for preparing a hollow fiber membrane configured to effect pervaporative dehydration of an organic solvent, the process comprising:
dissolving a first polymer in a first solvent to prepare a first spinning dope;
dissolving a second polymer in a second solvent to prepare a second spinning dope, the first polymer being immiscible with the second polymer;
mixing 10-99 wt % N-methyl-2-pyrrolidone (NMP) in a third solvent to prepare a bore fluid;
providing a triple orifice spinneret that has an external orifice, a middle orifice, and an internal orifice; and
co-extruding the first spinning dope at a flow rate of 0.01 to 10 ml/min and the second spinning dope at a flow rate of 0.01 to 20 ml/min respectively through the external orifice and the middle orifice via a dry-jet wet-spinning process into a coagulation bath and at the same time passing the bore fluid at a flow rate of 0.01 to 20 ml/min through the internal orifice, to form a hollow fiber having an inner layer and an outer layer, wherein the inner layer is a selective layer formed of the second spinning dope, the outer layer is a protective layer formed of the first spinning dope, and the inner layer includes an interface sublayer at its outer surface, in which the interface sublayer, being free of macrovoids and the first polymer, is in contact with the inner surface of the outer layer without delamination, wherein the first polymer is cellulose triacetate and the second polymer is polyether-imide.

2. The process of claim 1, wherein the first polymer is polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

3. The process of claim 2, wherein the first polymer is polyvinylidene fluoride, polyimide, or cellulose triacetate.

4. The process of claim 1, wherein the second polymer is polyimide, co-polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

5. The process of claim 2, wherein the second polymer is polyimide, co-polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

6. The process of claim 4, wherein the second polymer is polyether-imide, polysulfone, or co-polyimide.

7. The process of claim 3, wherein the second polymer is polyether-imide, polysulfone, or co-polyimide.

8. The process of claim 1, wherein the first solvent is NMP, tetrahydrofuran, methanol, dimethylacetamide, dioxane, dichloromethane, dimethylformamide, dimethyl sulfoxide, acetone, ethanol, propanol, butanol, glycols, or water; the second solvent is NMP, tetrahydrofuran, methanol, dimethylacetamide, dioxane, dichloromethane, dimethylformamide, dimethyl sulfoxide, acetone, ethanol, propanol, butanol, glycols, or water; and the third solvent is water, n-hexane, kerosene, dimethylacetamide, dioxane, dichloromethane, dimethylformamide, dimethyl sulfoxide, acetone, ethanol, propanol, butanol, or glycol.

9. The process of claim 1, wherein the first polymer has a critical concentration lower than that of the second polymer.

10. The process of claim 1, wherein there is an air gap of up to 100 cm between the coagulation bath and the spinneret during the co-extruding step.

11. The process of claim 1, wherein the co-extruding step is performed at 10° C. to 70° C. and the coagulation bath is kept at 5° C. to 70° C.

12. The process of claim 8, wherein there is an air gap of up to 100 cm between the coagulation bath and the spinneret during the co-extruding step, the co-extruding step is performed at 10° C. to 70° C., and the coagulation bath is kept at 5° C. to 70° C.

13. The process of claim 1, wherein the first solvent is NMP, the second solvent is NMP, the third solvent is water, the first spinning dope has a flow rate of 0.2 ml/min, the second spinning dope has a flow rate of 1.5 ml/min, the bore fluid has a flow rate of 1 ml/min, there is an air gap of 1.5 cm between the coagulation bath and the spinneret during the co-extruding step, the co-extruding step is performed at 25° C., and the coagulation bath is kept at 25° C.

14. A hollow fiber membrane prepared according to claim 1, the hollow fiber membrane comprising:
an outer layer formed of the first polymer, and
an inner layer formed of the second polymer, the outer surface of which is in contact with the inner surface of the outer layer,
wherein the inner layer is a selective layer, the outer layer is a protective layer, the inner layer includes an interface sublayer at its outer surface, in which the interface sublayer being free of macrovoids and the first polymer, is in contact with the inner surface of the outer layer, and the first polymer is immiscible with the second polymer.

15. The hollow fiber membrane of claim 14, wherein the first polymer is polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

16. The hollow fiber membrane of claim 15, wherein the first polymer is polyvinylidene fluoride, polyimide, or cellulose triacetate.

17. The hollow fiber membrane of claim 14, wherein the second polymer is polyimide, co-polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

18. The hollow fiber membrane of claim 15, wherein the second polymer is polyimide, co-polyimide, polyamide-imide, polyether-imide, cellulose acetate, cellulose diacetate, cellulose triacetate, polyamides, polysulfone, polyethersulfone, polyphenylsulfone, polyacrylonitrile, polyvinylidene fluoride, polycarbonate, polybenzimidazole, polyvinyl alcohol, alginates, chitosan, or polyvinylpyridine.

19. The hollow fiber membrane of claim 17, wherein the second polymer is polyether-imide, polysulfone, or co-polyimide.

20. The hollow fiber membrane of claim 16, wherein the second polymer is polyether-imide, polysulfone, or co-polyimide.

\* \* \* \* \*